United States Patent [19]

Smay

[11] Patent Number: 5,308,025

[45] Date of Patent: May 3, 1994

[54] SPACECRAFT SPIN AXIS CAPTURE SYSTEM AND METHOD

[75] Inventor: John W. Smay, Redondo Beach, Calif.

[73] Assignee: Hughes Aircraft Company, Los Angeles, Calif.

[21] Appl. No.: 921,676

[22] Filed: Jul. 30, 1992

[51] Int. Cl.$^5$ .............................................. B64G 1/38
[52] U.S. Cl. .................................. 244/170; 244/177
[58] Field of Search ................ 244/158 R, 164, 165, 244/170, 177

[56] References Cited

U.S. PATENT DOCUMENTS

| | | | |
|---|---|---|---|
| 3,591,108 | 7/1971 | Perkel et al. | 244/165 |
| 3,940,096 | 2/1976 | Keigler et al. | 244/165 |
| 4,096,427 | 6/1978 | Rosen et al. | 244/170 |
| 4,188,666 | 2/1980 | Legrand et al. | 244/164 |
| 4,728,062 | 3/1988 | Hubert | 244/164 |
| 4,824,052 | 4/1989 | Smay et al. | 244/170 |
| 4,960,250 | 10/1990 | Schmidt | 244/164 |
| 4,961,551 | 10/1990 | Rosen | 244/164 |
| 5,067,673 | 11/1991 | Fong | 244/164 |

FOREIGN PATENT DOCUMENTS 0225683  6/1987  European Pat. Off. ............ 244/164

Primary Examiner—Michael S. Huppert
Assistant Examiner—Virna Lissi Ansley
Attorney, Agent, or Firm—William J. Streeter; Wanda K. Denson-Low

[57] ABSTRACT

A control system and method for causing a spacecraft (10) initially spinning about a principal axis of inertia (H) to transition to spin about an arbitrary command axis (3) is presented in which the capture maneuver is performed in a way to preserve spacecraft attitude knowledge without sensor or attitude propagation by using a simple rate feedback loop. The capture is accomplished by applying a step torque about axes (1) and (2) transverse to the desired spin axis (3) creating an initial nutation. The nutation is subsequently damped actively by closing a rate feedback loop with a low pass filter and applying transverse torques proportional to the transverse nutational rate.

14 Claims, 3 Drawing Sheets

SPACECRAFT SPIN AXIS CAPTURE SYSTEM AND METHOD

TECHNICAL FIELD

The present invention is related to a control system and method to cause a spacecraft initially spinning about a principal axis of inertia to transition to spin about an arbitrary commanded axis.

BACKGROUND ART

A control system to provide a controlled spin about an arbitrary axis is disclosed in U.S. Pat. No. 4,961,551, commonly assigned with the present application, such a control system frees a spinning spacecraft from the requirement to be mass balanced and to spin about a principal axis of maximum or minimum inertia. However, that disclosure does not address the process of capture initialization of the desired spin motion.

The spin axis capture of the present invention has, as one application, the transition from spin about a principal axis of inertia to spin about the thrust axis of the liquid apogee motor which is not aligned with the principle axis of inertia. In prior applications, the apogee motor thrust axis has either been aligned with the principal axis of inertia or, if not so aligned, the spacecraft is not spin stabilized. Rather, the spacecraft is three axis stabilized with full three axis attitude sensing and control. Such stabilization systems require higher band width control, larger torquers (thrusters, for example) and much more complex sensing and control implementations.

DISCLOSURE OF INVENTION

The present invention provides a means of capture that transitions the spacecraft spin motion from its initial axis to a desired final axis while preserving spacecraft attitude. The spacecraft control system employs a simple angular rate feedback and an open-loop torque command to capture spin motion about the desired axis while preserving attitude.

The capture process begins with the spacecraft spinning about the principal axis of maximum inertia with no nutation being present. A step torque is applied creating an initial nutation which is subsequently damped actively by closing a rate feedback loop with a low pass filter and applying a transverse torque proportional to the transverse nutation rate. This will null the nutation while driving the desired spin axis to the position of the initial angular momentum vector.

One application of the spin axis capture system of the present invention occurs, for example, in a spacecraft in which the initial spin axis is displaced from a desired spin axis about an apogee motor thrust axis. The attitude is measured before the transition of the spin to the thrust axis. For accurate alignment of the apogee thrust impulse in inertial space, it is necessary to preserve attitude through the spin transition. This invention does so with a simple control scheme that does not require attitude propagation or precise knowledge of spin speed. If a capture maneuver is performed inaccurately or without regard to attitude, an attitude error on the order of the initial and final spin axis separation can result.

Further objects, features and advantages of the invention will become apparent from a consideration of the following description and the appended claims when taken in connection with the accompanying drawings.

DETAILED DESCRIPTION OF THE INVENTION

Figure 1:
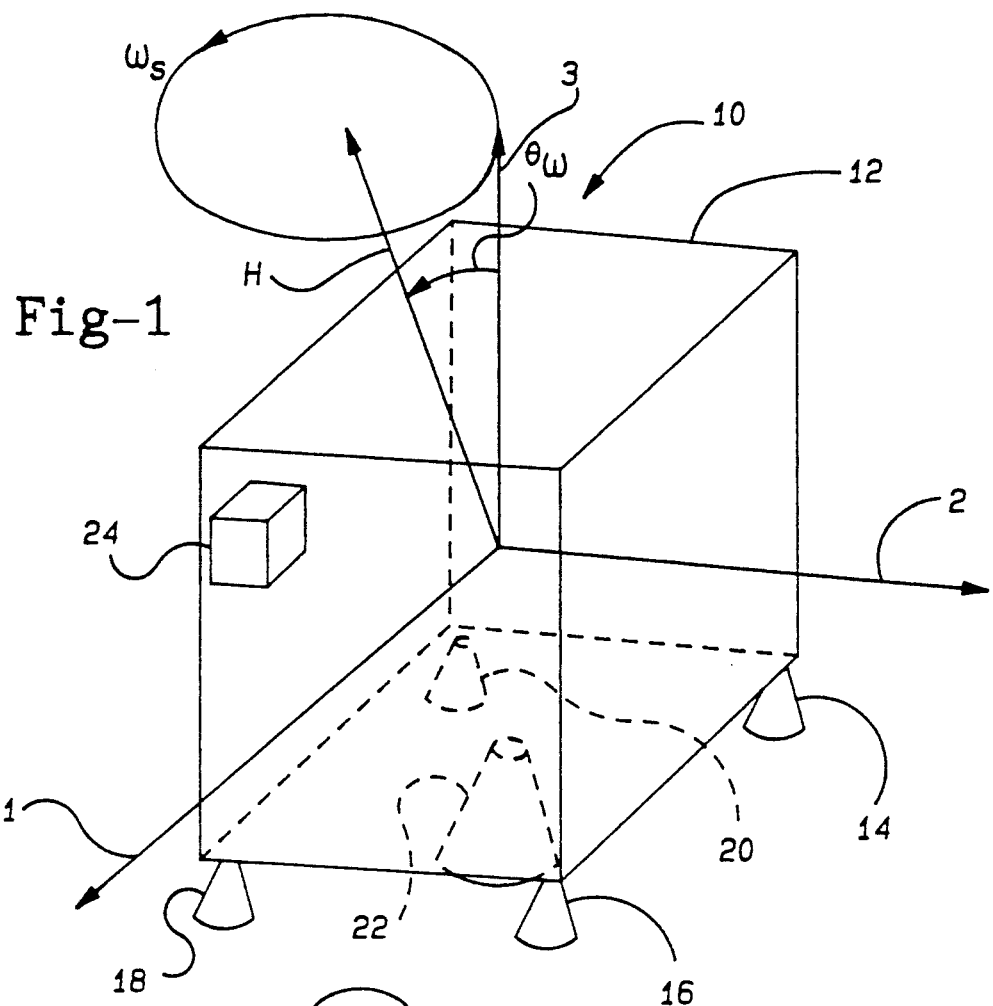
FIGS. 1 and 2 are perspective views schematically illustrating a spacecraft body showing orientation of the body relative to the momentum vector H before and after the spin axis capture of the present invention.

Consider a single body spacecraft spinning about its maximum principal axis of inertia, which is displaced from a desired or geometric spin axis by a dynamic imbalance product of inertia $I_{13}$. Such a scenario is shown in FIG. 1 with respect to spacecraft 10. Spacecraft 10 has a body 12 as shown with three mutually perpendicular geometric axes 1, 2 and 3. For simplicity in describing the invention, the spacecraft is assumed to have transverse inertia symmetry, i.e. the moments of inertia about axes 1 and 2 are equal. The spacecraft is initially spinning about its maximum principal axis of inertia shown by the momentum vector H such that the geometric axis 3 is coning about the momentum vector H at a wobble angle $\theta_W$.

While the spacecraft body 12 is shown as being a rectangular cube, it is to be understood that any shape desired for the body can be used. Four thrusters 14, 16, 18 and 20 are shown on the bottom of the spacecraft body, one at each of the corners. The thrusters can be fired to produce predetermined torques about the transverse axes 1 and 2. Positioned in the center of the spacecraft body on the bottom is a larger thruster referred to as a liquid apogee motor 22 for use in propelling the spacecraft to the desired orbit. The thrusters 14, 16, 18 and 20 can be positioned at locations other than the corners of the spacecraft body and the spacecraft will have additional thrusters (not shown) capable of producing torque about the transverse axes 1 and 2, the details of which are not needed for the present application.

Figure 2:
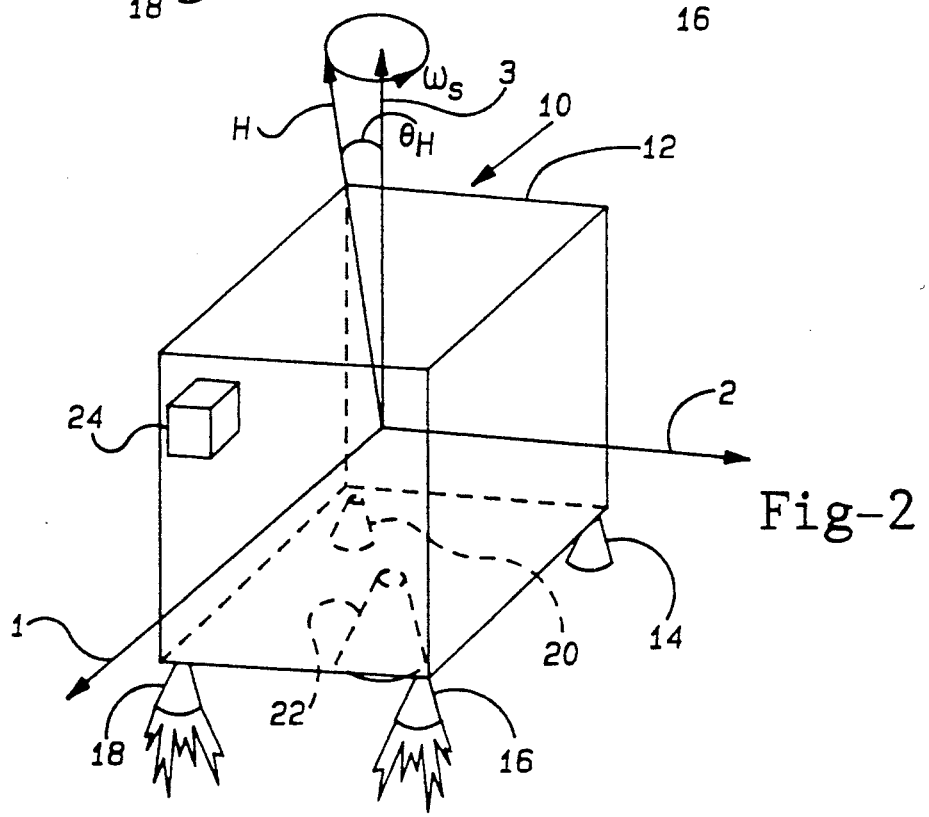

Spacecraft 10 also includes a controller shown as box 24 which contains attitude and position sensors, rate gyros, etc. used in controlling the spacecraft as is well known in the art. As described below, the controller fires the thrusters to produce the torques needed to transition spacecraft spin to the desired axis. The capture maneuver to be performed is to move the desired spin axis, in this case axis 3 into the inertial position of the angular momentum vector H and arrest its coning motion. Initially, the H vector is inertially fixed and with no torque on the spacecraft, the desired spin axis cones at spin rate $\omega_S$ about the H vector at a wobble angle $\Theta_W = I_{13}/[I_T - I_S]$ (where $I_T$ is the moment of inertia about axes 1 and 2.). After the capture, the desired spin axis is fixed in exactly the direction initially describing the H vector and the H vector cones at spin rate about this line with a cone angle $\Theta_H = T/H\omega_S = I_{13}\omega_S^2/I_S\omega_S^2 = I_{13}/I_S$. This is shown in FIG. 2. The ratio of the momentum coning angle to the wobble angle is $\Theta_H/\Theta_W = [I_T - I_S]/I_S = [1-\sigma]/\sigma \approx 1 - \sigma$, which is small when the transverse inertia ratio $I_S/I_T$ is near unity.

Torque equations for a single body with transverse inertia symmetry and a single product linearize to:

$$e_s^T \begin{bmatrix} I_T\omega_1 + I_T\lambda_s\omega_2 - I_{13}\omega_3 \\ I_T\omega_2 - I_T\lambda_s\omega_1 - 2I_{13}\omega_s\omega_3 \\ I_s\omega_3 - I_{13}\omega_1 + I_{13}\omega_s\omega_2 \end{bmatrix} = e_s^T \begin{bmatrix} T_1 \\ T_2 + I_{13}\omega_s^2 \\ T_3 \end{bmatrix} \quad (1)$$

where $\lambda = [I_S/I_T - 1]\omega_S = [\sigma - 1]\omega_S$ is the body nutation frequency.

With no nutation prior to beginning the capture sequence, $\omega(t) = [\Theta_W\omega_S, 0, 0]^T$. If at time $t=0$, a step torque $T_2 = -I_{13}\omega_S^2$ is applied, the constant terms of equation (1) vanish and the initial wobble rate becomes an initial nutation rate $\omega_1(0) = \Theta_W\omega_S$. The objective is to null this nutation while driving a spin axis to the position of the initial momentum vector H.

Figure 3:
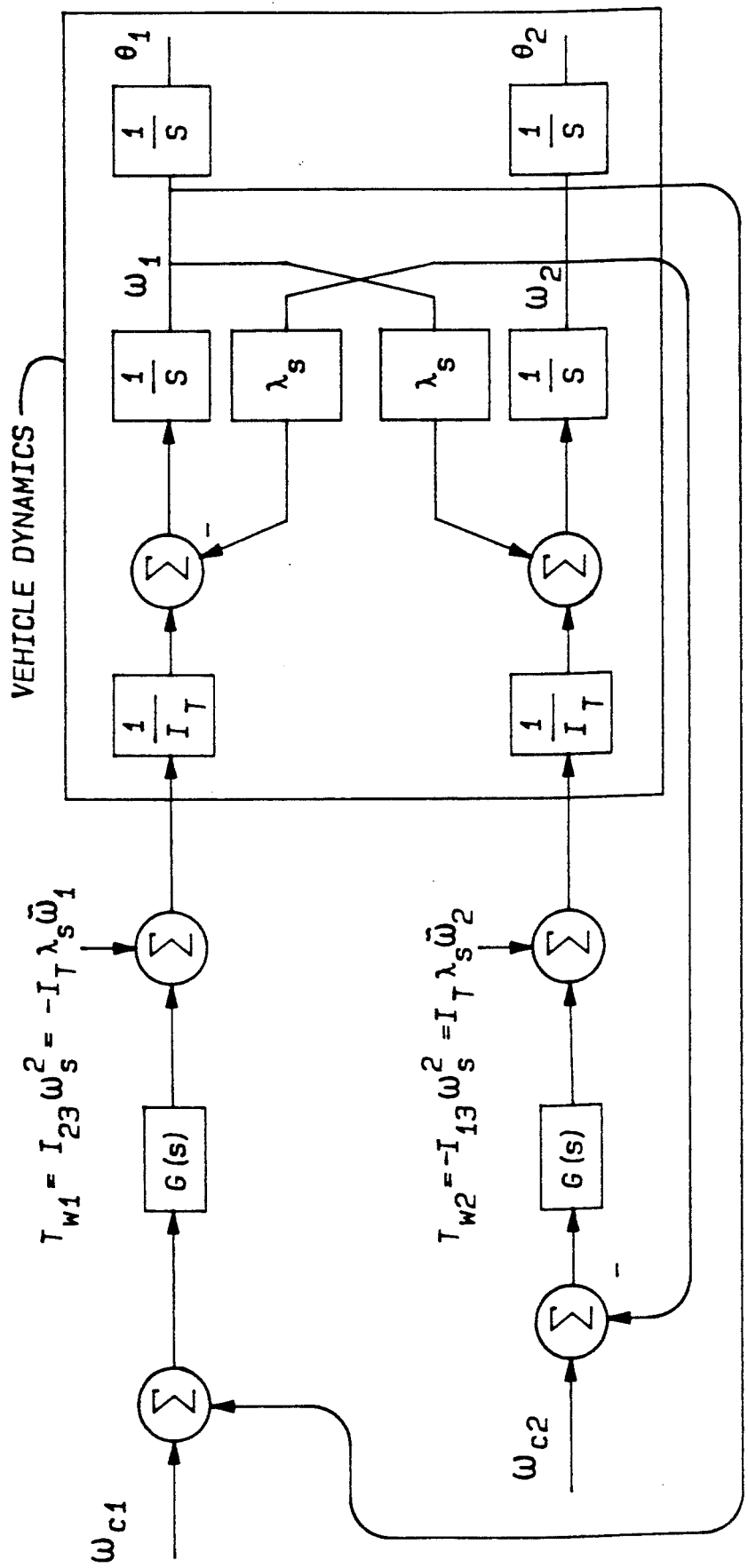
FIG. 3 is a schematic of the spin axis capture control system.

A simplified representation of the dynamics of equation (1) is shown in FIG. 3. Initially, the step torques $T_{W1}$ and $T_{W2}$ are applied about the transverse axes to cancel the wobble. Subsequently, a rate feedback loop is closed and the rates $\omega_1$ and $\omega_2$, sensed for example by rate gyros, are applied as torque commands after compensation by filter G(s).

At the initiation of the spin axis capture procedure, wobble canceling torques $T_{W1}$ and $T_{W2}$ about each of the transverse axes are applied as step inputs. As noted, this induces nutation equal to the preceding wobble angle. There are many ways to damp this nutation, and even multiple schemes to do so while substantially preserving the attitude of the angular momentum vector. For example, one ideal way would be to employ a purely passive damper which would remove the nutation without altering the momentum vector attitude. Such a process however, is rather lengthy, requiring several hours to complete. A second approach is to damp the nutation actively while simultaneously measuring and controlling attitude. The system of the present invention, however, actively dampens the nutation while preserving the attitude to a predetermined accuracy without the need to measure and control attitude.

The spin axis capture and method of this invention operates by using a closed rate feedback loop with a low pass filter over the frequency range from zero to the body nutation frequency $\lambda_S = (\sigma - 1)\omega_S$ with a gain G(0) and by applying transverse torque proportional to the transverse nutation rate. This will damp nutation with a time constant $\tau = I_T/G(0)$, will apply a maximum feedback torque of $T = G(0)\omega_T = G(0)\sigma\omega_S\Theta_n$, and will cause a maximum coning excursion of the momentum vector $\Theta_H = T/H\omega_S$.

As an example, assuming a spacecraft spinning at $\omega_S = 5$ rpm with $I_{13} = 25$ slug-ft$^2$ (34 kg-m$^2$) dynamic imbalance, spin inertia $I_S \approx 1450$ slug-ft$^2$ (1,970 kg-m$^2$) and spin to transverse inertia ratio $I_S/I_T = \sigma \approx 1.1$. These parameters will result in an initial wobble cone angle of $\Theta_W = 10°$. A gain of G(0) = 50 ft-lb/rad/sec (67.8 m-N/rad/sec) will produce maximum torque of 4.4 ft-lb (5.97 m-N) and momentum vector coning of 0.6° while damping nutation with a 26 second time constant. A proportional torque is obtained by duty cycle modulation of spacecraft thrusters as disclosed in U.S. Pat. No. 4,961,551. Hence, nutation will be arrested in about 100 seconds while less than 0.6° of attitude error is induced. The key trade is to maintain the feedback gain low enough until nutation is damped.

High gain feedback will apply large torques and force the momentum vector to the spin axis whose inertial position depends upon the instant of control application and is unknown. Low gain damping torque will allow the spin axis to approach the momentum vector, whose position is known.

Figure 4:
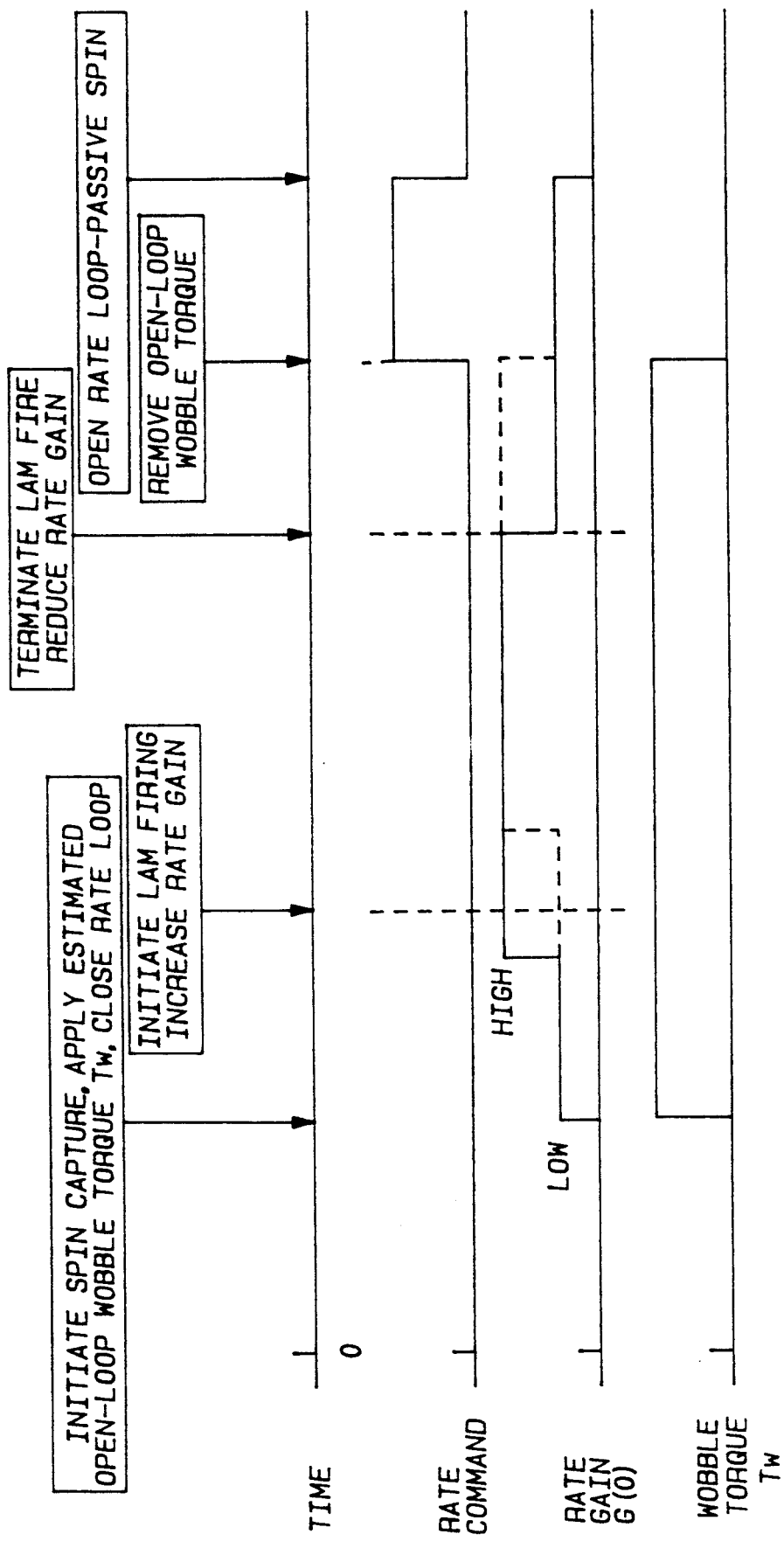
FIG. 4 is a time line of a liquid apogee motor burn sequence with wobble control according to the present invention.

A potential application of the capture technique disclosed herein is to control a spinning spacecraft to spin about the thrust axis of the liquid apogee motor 22 during the apogee injection maneuver. The scenario for this maneuver is illustrated by FIG. 4. Initially the spacecraft spins passively about its principal axis of maximum inertia which is substantially displaced from the thrust axis of the apogee motor by dynamic imbalance. At the initiation of the spin axis capture, the open loop wobble canceling torque $T_W$ is applied and the rate feedback loop is closed with a relatively low gain. The required torque $T_W$ is known by observation of the constant components of transverse rate $\omega$ as measured by gyros. After the torque $T_W$ is applied, the nutation damping torques are applied proportional to the transverse nutation rate.

A much larger gain may be desired during the liquid apogee motor burn period to attenuate coning motion induced by misalignment of the apogee motor. This gain is commanded after the nutation has been damped, either before or after the apogee motor firing starts as indicated respectively by solid and dashed lines on the rate gain plot of FIG. 4. At completion of the apogee motor burn, the gain is again lowered and an attitude preserving return to passive a spin is executed by essentially reversing the capture sequence. That is, the wobble cancelling torque $T_W$ is removed and the constant wobble transverse rate is commanded. This will again induce a large nutation which is gracefully damped by the low gain rate feedback applied as a transverse torque proportional to the transverse nutation rate. After allowing nutation to damp, the entire control is disabled and the spacecraft resumes passive spin.

The capture method and the control system frees a spinning spacecraft from the troublesome requirement to be mass balanced with a principal axis of maximum or minimum inertia in alignment with the thrust axis of the apogee motor. The method and system further allows attitude determination with simple spinning sensors.

It is to be understood that the invention is not limited to the exact construction and method illustrated and described above, but that various changes and modifications may be made without departing from the spirit and scope of the invention as defined in the following claims.

What is claimed is:

1. In a spacecraft having a body spinning in a steady state about a principal axis of inertia and having an angular momentum vector, and said spacecraft having a control system, a method of transitioning the spacecraft body to spin about an arbitrary commanded axis having two mutually perpendicular transverse axes, said commanded spin axis coning about said angular momentum vector in said steady state, said method comprising the steps of:

applying predetermined torques $T_1$ and $T_2$ about each of said transverse axes to cancel wobble of said commanded spin axis and thereby inducing nutation about said transverse axes;

measuring rates of nutation about said transverse axes; and applying nutation damping torques about said transverse axes proportional to said transverse nutation rates to actively dampen said nutation and drive said commanded spin axis to the position of the initial momentum vector.

2. The method of claim 1 wherein said nutation damping torques are determined through a transverse axis rate feedback loop in said control system.

3. The method of claim 2 wherein said rate feedback loop includes a low pass filter over a frequency range from zero to a spacecraft body nutation frequency and having a gain G(0).

4. The method of claim 1 wherein said predetermined torques $T_1$ and $T_2$ are determined by the relationships $T_1 = I_{23} \omega_S^2$ and $T_2 = I_{13} \omega_S^2$ where:
I is the product of inertia; and
$\omega_S$ is the spin rate about the desired spin axis.

5. The method of claim 2 including returning the spacecraft to passive spin about said principal axis of inertia, comprising the steps of:
removing said torques $T_1$ and $T_2$ about said transverse axes;
commanding a constant wobble transverse rate by applying a torque about said transverse axes whereby a nutation is induced;
applying nutation damping torques about said transverse axes proportional to the transverse nutation rates to dampen the nutation through said rate feedback loop with a low gain; and
after nutation is damped, opening said rate feedback loop.

6. In a spacecraft spinning in a steady state about a principal axis of inertia and having an angular momentum vector, said spacecraft having a control system and a thruster for use in elevating said spacecraft to a desired orbit, said thruster having thrust axis which is angularly displaced from said principal axis of inertia and thereby coning about said angular momentum vector in said steady state, a method of transitioning to spin about said thrust axis comprising the steps of:
applying predetermined torques $T_1$ and $T_2$ about a pair of transverse axes normal to said thrust axis to cancel wobble of said thrust axis and thereby inducing nutation about said transverse axes;
measuring rates of nutation of said spacecraft about said transverse axes; and
applying nutation damping torques about said transverse axes proportional to said transverse nutation rates to dampen said nutation and drive said thrust axis to the initial position of said momentum vector.

7. The method of claim 6 wherein said nutation damping torques are determined through a transverse axis rate feedback loop in said control system.

8. The method of claim 7 wherein said rate feedback loop includes a low pass filter over a frequency range from zero the spacecraft body nutation frequency and having a gain G(0).

9. The method of claim 8 including injection of said spacecraft into the desired orbit and returning it to passive spin about said principal axis of inertia, comprising the steps of:
after said nutation has been dampened, firing said thruster to lift said spacecraft to the desired altitude;
removing said torques $T_1$ and $T_2$ about said transverse axes;
commanding a constant wobble transverse rate applied as a torque about said transverse axes whereby a nutation is again induced;
applying nutation damping torques about said transverse axes proportional to the transverse nutation rates to dampen the nutation through a low gain rate feedback loop; and
after nutation is damped, opening the rate feedback loop.

10. The method of claim 9 further comprising the step of:
increasing the gain of said rate feedback loop during the firing of said thruster.

11. A control system in a spacecraft spinning in a steady state about a principal inertia axis and having an angular momentum vector for transitioning the spacecraft to spin about an arbitrary commanded axis with first and second mutually perpendicular transverse axes, said commanded spin axis coning about said momentum vector in said steady state comprising:
measuring means for detecting angular rates of motion about each of said transverse axes;
thruster means for providing positive and negative torques about said first and second transverse axes; and
control means for firing said thruster means to produce a transverse torque inducing a nutation rate about said transverse axes and for subsequently firing said thruster means to produce a wobble canceling torque about said first and second transverse axes proportional to the transverse nutation rate and having a rate feedback loop with a low pass filter having a gain G(0) over a frequency range from zero to the spacecraft body nutation frequency to dampen said nutation and drive said commanded spin axis to the initial position of said momentum vector.

12. The control system of claim 11 wherein said control means includes a transverse rate feedback loop with a low pass filter over a frequency range from zero to the spacecraft body nutation frequency to produce nutation damping torques proportional to the transverse rates.

13. The control system of claim 12 wherein said feedback loop has a gain G(0) over a frequency range from zero to approximately spacecraft body nutation frequency.

14. The control system of claim 13 wherein said spacecraft has an apogee motor with a thrust axis and said thrust axis is said arbitrary commanded axis, said control system further comprising:
means for firing said apogee motor when nutation is damped and said spacecraft is spinning about said thrust axis; and
means for increasing the gain of said feedback loop during said firing of said apogee motor.

* * * * *